(12) United States Patent
Müller et al.

(10) Patent No.: US 11,761,500 B2
(45) Date of Patent: Sep. 19, 2023

(54) DAMPING MATERIAL AS INTERMEDIATE LAYER FOR A BRAKE PAD AND PROCESS FOR MAKING THE DAMPING MATERIAL

(71) Applicant: TMD Friction Services GmbH, Leverkusen (DE)

(72) Inventors: Georg Müller, Essen (DE); Mirza Lakota, Grevenbroich (DE); Harald Bendt, Leverkusen (DE); Katja Lieb, Meerbusch (DE)

(73) Assignee: TMD Friction Services GmbH, Leverkusen (DE)

( * ) Notice: Subject to any disclaimer, the term of this patent is extended or adjusted under 35 U.S.C. 154(b) by 383 days.

(21) Appl. No.: 17/319,400

(22) Filed: May 13, 2021

(65) Prior Publication Data
US 2021/0364052 A1  Nov. 25, 2021

(30) Foreign Application Priority Data
May 19, 2020  (DE) .......................... 102020113510.6

(51) Int. Cl.
*F16D 65/092* (2006.01)
*C08J 3/20* (2006.01)
*C08L 9/02* (2006.01)
*C08L 23/08* (2006.01)
(Continued)

(52) U.S. Cl.
CPC ............ *F16D 65/092* (2013.01); *C08J 3/203* (2013.01); *C08L 9/02* (2013.01); *C08L 23/0869* (2013.01);
(Continued)

(58) Field of Classification Search
CPC ........... F16D 65/092; F16D 2250/0023; F16D 2200/0056; F16D 2200/006; C08L 9/02;
(Continued)

(56) References Cited

U.S. PATENT DOCUMENTS 4,163,762 A  8/1979 Rudd
5,407,034 A * 4/1995 Vydra .................... B32B 15/08
188/251 A
(Continued)

FOREIGN PATENT DOCUMENTS

CN  1982739 A  6/2007
DE  4231549 A1  4/1993
(Continued)

OTHER PUBLICATIONS

EP document No. EP 0621414 to Hummel et al published on Oct. 26, 1994.*
(Continued)

*Primary Examiner* — Pamela Rodriguez
(74) *Attorney, Agent, or Firm* — Rogowski Law LLC (57) ABSTRACT

A damping material 10 for a damping layer or interlayer of a brake lining has at least one rubber content and one resin content. A plurality of macroscopic, heterogeneously delimited areas are formed in the damping material 10, areas comprising rubber areas 1 with a high rubber content of at least 3% to maximally 50% by weight, and resin areas 2 with a high resin content of at least 5% by weight, wherein the rubber areas 1 are free of resin or have a resin content ≤5% by weight, and the resin areas 2 are free of rubber.

20 Claims, 2 Drawing Sheets

(51) Int. Cl.
*C08L 31/04* (2006.01)
*C08L 33/06* (2006.01)

(52) U.S. Cl.
CPC ............. *C08L 31/04* (2013.01); *C08L 33/062* (2013.01); *F16D 2200/006* (2013.01); *F16D 2200/0056* (2013.01); *F16D 2250/0023* (2013.01)

(58) Field of Classification Search
CPC .... C08L 23/0869; C08L 31/04; C08L 33/062; C08J 3/203
See application file for complete search history.

(56) References Cited

U.S. PATENT DOCUMENTS

| | | | | |
|---|---|---|---|---|
| 6,041,893 | A | * | 3/2000 | Ervens .................. F16D 69/00 188/251 A |
| 6,908,965 | B2 | | 6/2005 | Heliger |
| 9,493,637 | B2 | | 11/2016 | Akahori |
| 9,765,836 | B2 | | 9/2017 | Ikeda et al. |
| 2007/0117881 | A1 | | 5/2007 | Watanabe et al. |

FOREIGN PATENT DOCUMENTS

| | | |
|---|---|---|
| DE | 10061543 A1 | 6/2002 |
| DE | 112012001835 T5 | 1/2014 |
| EP | 0849488 B1 | 6/1998 |
| GB | 2260173 A | 4/1993 |

OTHER PUBLICATIONS

EP document No. EP 2634448 to Ota et al published on Sep. 4, 2013.*

Canadian Patent No. CA 3120157 to Mueller et al published on Nov. 19, 2021.*

* cited by examiner

DAMPING MATERIAL AS INTERMEDIATE LAYER FOR A BRAKE PAD AND PROCESS FOR MAKING THE DAMPING MATERIAL

BACKGROUND OF THE INVENTION

Technical Field and State of the Art

The present invention relates to a damping material for a damping layer or interlayer (also referred to as an underlayer) for brake linings in order to enhance the comfort properties of brake linings or brakes. Moreover, the invention also relates to a brake lining having a damping layer or interlayer made of the damping material, and to a method for the production of the damping material.

The comfort properties of the brakes are of great significance for the brakes used nowadays. These properties include the noise generation by the brakes and the mechanical vibrations during the braking procedure. Both phenomena are linked to the occurrence of vibrations which, depending on the type of brake system, can occur at different frequencies. In order to suppress the vibrations or to damp them, thus minimizing both phenomena, an interlayer can be inserted between the friction layer and the carrier plate of a brake lining. In this context, the interlayer has to display not only comfort properties but also high mechanical strength.

The state of the art comprises brake shoes or brake linings consisting of a lining carrier and a friction lining as well as an interlayer as the damping element that is arranged between the friction lining and the lining carrier in order to prevent squealing caused by friction. Such an interlayer can damp resonance vibrations that occur during braking. Such damping layers are disclosed, for example, in European patent application EP 0 621 414 A1, U.S. Pat. No. 5,407,034, German patent applications DE 10 2013 108 159 A1, DE 42 315 49 A1, or European patent specification EP 0 849 488 B1, and can be made of various materials or material mixtures. The state of the art also discloses the use of damping plates in disc brake linings for the above-mentioned purpose; see European patent application EP 1 035 345 A2.

Moreover, the state of the art also proposes friction linings or friction materials that themselves already exhibit noise-reducing or damping properties such as, for instance, according to U.S. Pat. No. 9,765,836 B2.

Furthermore, when damping layers are employed as the interlayer between the actual friction lining and the lining carrier, it is necessary to consider not only the high mechanical requirements but also the fact that no layer separation should occur between the friction lining and the interlayer, and also no edge detachment. The term "edge detachment" refers to the partial detachment of the interlayer layer from the lining carrier plate.

The results achieved so far in terms of the above-mentioned properties continue to call for improvements, especially when it comes to the use of friction linings and brake linings in the automobile and truck industries.

Before this backdrop, an objective of the present invention was to put forward a brake lining, especially for disc brakes, which, while maintaining or improving the performance properties, can also achieve an optimization of the comfort properties, especially with an eye towards reducing the generation of noise and the occurrence of mechanical vibrations during ongoing operation.

SUMMARY OF THE INVENTION

This objective is achieved by means of a damping material according to the invention for a damping layer or interlayer for brake linings and especially by means of a brake lining having a damping layer or interlayer that is made of the damping material according to the invention and that is arranged between the actual friction lining and the lining carrier (the lining carrier plate).

The desired minimization or suppression of vibrations on a brake lining during ongoing operation can be determined by means of damping measurements known from and used in the state of the art. The development of friction linings and brake linings preferably involves using a so-called natural frequency measurement. In order for the development to progress efficiently, a reference brake lining that has a damping layer between the lining carrier and the friction lining is used.

The minimum requirements preferred according to the invention of such a brake lining can be summarized as follows regarding the most important parameters:
(1) shear strength >400 N/cm$^2$.
(2) shear strength >250 N/cm$^2$ after temperature stress.
(3) during the natural frequency measurement, the damping should be at a value >15‰.
(4) the compressibility should be at a value between 150 μm and 200 μm.
(5) no layer separation should occur after thermal stress (evaluation of the crack formation ≥9).
(6) no detachment from the carrier plate should occur after mechanical stress (evaluation of the crack formation ≥9).

The shear strength (1) is ascertained in accordance with ISO 6312.

Shear strength (2) after stress: here, the test is carried out as in (1) but after high thermal stress. In this context, the following conditions as shown in the table below apply for the dynamic test:

| Series | Name | n | $v_a$ [km/h] | $V_e$ [km/h] | p [bar] | a [%] | $T_a$ [° C.] | Air intake |
|---|---|---|---|---|---|---|---|---|
| 3 | braking start | 100 | 100 | 50 | 25 | — | 100 | 100% |
| 4 | initial fading | 5 | 135 | 80 | — | 65 | 150; 225; 300; 350; 400 | variable |
| 5 | cleaning stoppages | 3 | 100 | 5 | — | 100 | 100 | variable |
| 6 | friction value determination | 5 | 100 | 50 | 25 | — | 100 | variable |
| 7 | newsprint test | 10 | 105 | 5 | — | 110 | 100; 175; 250; 300; 350; 400; 425; 450; 475; 500 | variable |
| 8 | single procedure braking at 200 km/h | 2 | 200 | 5 | — | 110 | 100 | variable |

-continued

| Series | Name | n | $v_a$ [km/h] | $V_e$ [km/h] | p [bar] | a [%] | $T_a$ [° C.] | Air intake |
|---|---|---|---|---|---|---|---|---|
| 9 | cleaning stoppages | | | | like series 5 | | | |
| 10 | performance test | 15 | 200 | 100 | — | 60 | 100; 250; 400; 450; 550; 600; 625; 650; 675; 700; 705; 710; 715; 720; 725 | variable |
| 11 | cleaning stoppages | | | | like series 5 | | | |
| 12 | friction value determination | | | | like series 6 | | | | n: number of braking procedures
$v_a$: speed at the beginning of the braking procedure
$v_e$: speed at the end of the braking procedure
p: braking pressure
a: delay in g, whereby 100% amounts to 1 g, g = 9.81 m/s$^2$
$T_a$: temperature of the brake disc at the beginning of the braking procedure (3): The natural frequency measurement was carried out in accordance with standard DIN ISO 6267. The damping is determined on the basis of the decrease of the first amplitude.
(4): The compressibility is determined in accordance with ISO standard 6310. In this context, the compressibility was indicated in μm. As a rule, a tolerance of ±15% is accepted at this value. The value for the new system has to be within the tolerance values that also applied in the old system.
(5): Evaluation of layer separation and (6) evaluation of the detachment from the carrier plate: the evaluation of the lining is carried out after the stress test in examination (2). In this context, the following scale applies for evaluating the damage:
1=complete detachment/separation/destruction
2=very pronounced
3=pronounced
4=moderate to pronounced
5=moderate
6=slight to moderate
7=slight
8=very slight
9=to a small extent
0=not visible (10)

Only with a classification in categories 9 or 10 is the test considered as having been passed. In this context, a metal sheet with a thickness of 50 μm is used for the classification in category 9. Only if the metal sheet cannot be pushed into a crack that has formed does the crack still meet the criteria to be classified in category 9.

According to the invention, it has been found that such a property profile can be achieved only by damping layers made of special elastic materials. Moreover, it has been found that these elastic materials should be further reinforced through the use of resins and fibers in order to achieve a combination of the requisite high mechanical (e.g. high shear strength) and high damping properties.

Moreover, it was an additional objective of the present invention to put forward materials having the above-mentioned properties in the most cost-efficient manner possible which, at the same time, thereby making it possible to use so-called inexpensive standard materials and to largely make do without expensive special components. When it comes to elastomeric standard materials, according to the invention, these are standard elastomers, among which preference is given to the following known standard rubbers:
NBR: nitrile butadiene rubber
BR: butadiene rubber
IIR: isobutylene isoprene rubber
BIIR: bromobutyl rubbers
CIIR: chlorobutyl rubber/chlorinated butyl rubber
EPM: ethylene-propylene copolymer/ethylene-propylene rubber
EPDM: ethylene-propylene diene monomer rubber
NR: natural rubber
SBR: styrene-butadiene rubber
CM: chlorinated polyethylene
IR: isoprene rubber
AEM: ethylene acrylic polymethylene rubber
EAM: ethylene vinyl acetate rubber
ACM: polyacrylate rubber These standard elastomers, either on their own or in combination with each other, constitute the elastomeric main constituent of the damping material according to the invention. Other elastomeric substances or components and/or various fillers and/or fibers can also be added to this elastomeric main constituent. The other elastomeric components are preferably rubbers that belong to the category of the standard rubbers. Here, however, it is also possible to employ fluorine rubbers of the type described, for example, in German patent application DE 10 2013 108 159 A1. Especially preferred as set forth in the present invention, be it on their own or else in combination with other elastomers or rubbers of the ones mentioned here, are acrylate rubbers of the type sold, for instance, by the Denka Company Ltd. of Tokyo, Japan, under the brand name Denka ER. These are ethylene-vinyl acetate-acrylic acid-ester copolymers which generally belong to the EVAC (ethylene-vinyl acetate) category of plastics. These copolymers are available from the Denka company in several types which differ, among other things, in terms of different radicals such as, for example, epoxy and carboxyl, that serve to cure the polymer (so-called cure sites). The above-mentioned elastomers are especially characterized by high temperature resistance and high oil resistance.

The various fillers which, according to the invention, can also be present as a mixture of various fillers, are preferably carbon blacks and/or silicates.

The fibers that are suitable according to the invention and that can also be present as a mixture of various fibers are preferably mineral fibers and/or aramid fibers and/or metal fibers, whereby, as set forth in the invention, the term "metal fibers" also includes metal wool and metal shavings.

Therefore, the fillers and fibers that can be used according to the invention are those known in the state of the art for the production of friction linings.

The use of fillers and especially of fibers gives rise to a so-called reinforced rubber phase. For this reason, such fillers are also referred to here as active fillers. They stand out for the fact that either they have a particle size <100 nm and interact with the rubber phase or they have a high aspect ratio, i.e. the ratio of the height or depth of a structure to its smallest width (as fibers or platelets). When it comes to fibers or exfoliated layers, for instance, separated layers of phyllosilicates, the decisive factor is that they have a size <500 μm at least in one dimension.

Aside from these, the formulation also comprises other fillers that do not bring about any specific improvement of the properties. They can be very different in nature. They are normally characterized by their particulate structure. They either do not undergo a strong interaction with the other constituents in the mixture or else they have a particle size >100 nm, so that their specific surface area is so small that the number of interactions with the mixture constituents is likewise small.

Examples of suitable fillers are carbon particles and/or composite materials consisting of silicate and silane, particularly silicate fibers or phyllosilicates that have been coated with silanes. Suitable fillers are also, for example, $BaSO_4$, $CaCO_3$, Zn and/or graphite.

In summary, Phase 1 (containing rubber) has, for example, the following composition as shown in the table:

| Constituent | Preferred composition (% by weight) | Especially preferred composition | Special composition (% by weight) relative to Phase 1 |
| --- | --- | --- | --- |
| rubber | 3-50 | 5-25 | 15 |
| fibers | 20-90 | 30-60 | 50 |
| fillers | 0-50 | 15-40 | 35 |
| resins | 0-5 | 0-3 | 0 |

Surprisingly, it has been found that the best results by far in terms of the damping properties pertaining to the damping of brake noises and mechanical vibrations were achieved if the damping material was produced in the form of a so-called two-phase system (Phase 1/Phase 2). In this context, the first phase (Phase 1) contains the rubber particles according to the invention and it has a particulate structure with particle sizes preferably smaller than 4 mm.

The particles of Phase 1 can form a network with each other in the damping material, especially a percolating network. For this purpose, a particle content >50% by volume in the damping material is especially advantageous. In the case of the above-mentioned network, several particles of the Phase-1 material can lie on each other or against each other in the damping material and can form strands or irregular cohesive structures from Phase 1 in the damping material. The network advantageously has improved damping properties in comparison to individual particles in the same amount.

The particle size results from the production method of the Phase-1 particles. They are produced by means of a grinding process. Here, a perforated plate having a diameter of 4 mm is preferably used. This means that all of the particles that are transferred from the grinding chamber into the collecting bin can only have a maximum diameter of 4 mm.

The rubber content in Phase 1 is preferably 3% to 50% by weight, especially 5% to 25% by weight, and especially preferably 15% by weight, relative to the weight of Phase 1.

The fillers or filler mixtures and/or the fibers or fiber mixtures contained in Phase 1 (reinforced rubber phase) have particle sizes of preferably 4 nm to 200 nm in the case of the fillers, and of 0.75 mm to 1.2 mm (fiber lengths) in the case of the fibers.

Phase 2 (matrix phase) contains the resin or resin mixtures and optionally additional fillers, and optionally additional fibers or fiber mixtures.

In summary, Phase 2 has, for example, the following composition as shown in the table:

| Component | Preferred composition (% by weight) | Especially preferred composition | Special composition (% by weight) relative to Phase 2 |
| --- | --- | --- | --- |
| resin | 5-50 | 10-35 | 18 |
| fibers | 10-90 | 10-70 | 54 |
| fillers | 0-50 | 15-40 | 28 |

The resins used in Phase 2 amount to a content of preferably 5% to 50% by weight in this phase. Fundamentally speaking, all of the resins, resin mixtures or binders known for use in conjunction with friction linings, for instance, phenol-formaldehyde resin or polyacrylonitrile, are suitable according to the invention. This holds true for Phase 2 as well as for Phase 1.

Here, the fibers amount to a content of preferably 10% to 90% by weight. The preferred fibers here are metal fibers. They especially make up a content of 32% by weight. Aramid fibers are preferably present at a content between 1% and 6% by weight. All percentage-by-weight values are relative to the total weight of Phase 2.

The volume ratio of Phase 1 to Phase 2 for the production of the damping material is preferably 50:50 to 70:30 all the way to 90:10 and all possible values in-between (indicated in % by volume). The content of Phase 1 is advantageously selected so high as to form the above-mentioned networks or cohesive structures in the damping material or in the brake lining, consisting only of Phase 1. This especially encompasses a percolating network from Phase 1. Theoretically, in the case of particles having approximately the same size, this network is formed only starting at a volume content >74% by volume. In the case of particles having different sizes, the value is higher the greater the distribution of the particle diameters is. At the same time, Phase 2 should advantageously still be able to form a stable matrix in order to ensure a high strength of the damping material. This is particularly the case with these percentages by volume.

Phase 2 also preferably contains fillers which, in turn, are present at a content of preferably 0% to 50% by weight in Phase 2. The percentages by weight indicated for the components of Phase 2 are all relative to the total weight of Phase 2.

The preferred fillers and/or fibers are identical for Phase 1 and Phase 2, whereby preferably rubber and the particulate and active fillers that typically reinforce the rubber are added only to Phase 1, and the resin system is added only to Phase 2. In another preferred embodiment, Phase 1 can also contain up to 5% by weight of resin or resin mixtures. The resin content in Phase 1 is always smaller than in Phase 2 (resin phase). In the preferred embodiment, Phase 1 (rubber phase) is free or largely free (as defined below) of any resin content.

Phase 2 preferably surrounds Phase 1, that is to say, the particles of Phase 1, in such a manner that they are embedded in the matrix consisting of Phase 2. In this context, however, the extent to which they are surrounded is considerably less than 100% for the most part, so that the particles of Phase 1 are still in contact with each other. The structure of the two-phase damping material according to the invention can be clearly seen with an optical microscope and even with the naked eye.

Phase 2 can form a network or matrix in the damping material. This network is advantageously complementary to the network from Phase 1 described above.

The superior damping properties are primarily due to Phase 1, whereas the requisite high mechanical stability is effectuated by Phase 2.

In order to ensure the superior properties of the damping materials or damping layers according to the invention, it is necessary to adhere to the production process according to the invention. The damping materials obtained are characterized by the production process, the so-called product-by-process characterization.

In order to produce Phase 1 (rubber phase, especially reinforced), the fillers and/or the fibers and optionally the resin are incorporated or kneaded into the rubber, for example, in a kneader. In this process, the kneader or the kneading operation create a dispersion of the fillers and/or of the fibers and also effectuate a uniform distribution of the above-mentioned components.

A differentiation can be made between active and non-active fillers. The active fillers or the fillers that reinforce the rubber phase encompass, for instance, carbon black particles and especially also the silicate/silane system. Examples of other active fillers are silicate fibers or phyllosilicates that have been coated with silanes.

Examples of non-active fillers are $BaSO_4$, $CaCO_3$, Zn or graphite.

A fundamental distinction has to be made between a kneading process and a mixing process. In a kneading process, the constituents are processed above the glass-transition temperature of the rubber in such a way that a dispersion as well as a distribution of the fillers can be achieved. This cannot be achieved with a mixing process. The "grinding step" takes place after at least one kneading step or after the kneading operation has been carried out.

The particles of Phase 1 are generated by means of the grinding process that is carried out after the kneading. In this context, the preferred particle size for all of the constituents of Phase 1 is smaller than 4 mm. The grinding process can involve a pre-comminution employing a knife mill, for instance, at 650 rpm using a 16-mm perforated sieve. The pre-comminution can be followed by fine comminution employing a cross beater mill, for example, at 4000 rpm using a 4-mm square sieve. Thanks to the grinding, Phase 1 is present in the form of particles.

This is followed by a mixing process for Phases 1 and 2, in which the Phase-1 particles in the matrix consisting of Phase 2, especially the resin, are distributed. In this process, the particles produced by the grinding procedure largely retain their original size. At the beginning of the mixing process, the raw materials of Phase 2 do not yet constitute a uniform phase. All of the raw materials are still present in the form of powder or fiber bundles. The mixing process creates a batch consisting of the various raw materials of Phase 2 and the particles of Phase 1. During the mixing phase, particularly the fiber bundles are still broken apart.

The mixture can be produced employing a mixer manufactured by the Eirich company (Eirich intensive mixer), for example, at a mixing temperature ranging from room temperature to 50° C., at a spinning speed of 5 m/s to 40 m/s, at a trough speed level 1 or 2, and over a mixing time of 1 minute to 30 minutes.

Here, the fundamental difference between a kneading process and a mixing process is significant. The kneading process is carried out at an elevated pressure and at an elevated temperature (T>100° C.). This creates a phase in which the fillers to be dispersed have already been incorporated into the rubber and are surrounded by it. Pressure is absent in the case of a pure mixing process. As a rule, the mixing also takes place at room temperature. Although the constituents are distributed, the fillers are not yet embedded into the rubber phase. Consequently, the mixture is present as a batch after the mixing process. The result after the kneading process can be considered to be a dispersion.

Phases 1 and 2 interact with each other during the subsequent pressing process for the production of the damping material (in the form of a material layer or a film). During the pressing process, the resin from Phase 2 liquefies and surrounds the remaining particles from Phase 2 as well as the particles from Phase 1 that are up to 4 mm in size. In this context, the extent to which they are surrounded is preferably less than 100% for the most part, so that the particles of Phase 1 can still remain in contact with each other.

The production process of a brake lining according to the invention can take place in a continuously operating press. Here, a friction lining mixture and a damping layer consisting of the damping material described above is filled into the pressing mold, for instance, at two stations. For example, the pressing temperature here can be from 100° C. to 200° C., the pressing time can be from 60 seconds to 420 seconds and the pressing pressure can be from 3 bar to 200 bar. In this context, the ratio of friction material to interlayer material is preferably 30%:1% by weight all the way to 2%:1% by weight.

Subsequently, a lining carrier plate is placed into a cavity. In this context, an associated mirror plate, a stamp and a profile plate preferably have a temperature between 130° C. and 190° C. The pressing time is preferably between 1 minute and 6 minutes. The specific pressure is, for example, 6 $N/mm^2$ and 145 $N/mm^2$.

The linings are then still cured. This process can be carried out in a stationary manner in an oven. The curing temperature can be, for instance, from room temperature to 300° C., and with a curing time can be from 30 minutes to 24 hours.

The linings can likewise be cured in a continuous procedure, for example, at a curing temperature ranging from room temperature to 700° C., and with a curing time from 5 minutes to 30 minutes.

In summary, the preferred features of the damping material formulation according to the invention can be specified as follows:

1) The rubber phase (Phase 1) preferably contains no resin or the resin content in the rubber phase is 5% by weight.
2) The rubber phase does not contain any other organic cross-linking chemicals that bring about a covalent cross-linking of the rubber.
3) The entire mixture contains no constituents—except for the rubber—that have a decomposition temperature <130° C.

4) Reinforcing fillers are incorporated into the rubber phase. They have to be dispersed and distributed during the kneading process.

The matrix (Phase 2) once again contains—aside from the resin that forms the matrix—essentially active and non-active fillers and/or fibers.

Moreover, the content of Phase 1 is relevant. Here, preference is given to the use of a content >50% by weight, especially 60% to 70% by weight, relative to the weight of the finished damping material.

It has been found that particularly advantageous results can be achieved for the damping layers according to the invention containing NBR rubbers and the above-mentioned acrylate rubbers. Since the rubbers that are suitable according to the invention can often be standard rubbers, the damping materials according to the invention also entail clear cost advantages in comparison to solutions, for instance, with special polymers.

The interlayer or damping layer according to the invention can be configured with one layer or multiple layers. It preferably has one layer. Its thickness varies as a function of the configuration of the lining carrier and of the friction lining. However, as a rule, it amounts to approximately 2 mm to 4 mm.

The damping layer is preferably bonded to the lining carrier plate by means of an adhesive layer and/or by using studs.

Good adhesion between the damping layer and the friction lining bonds the damping layer. Before the final pressing procedure, the resin from the damping layer and the resin from the friction lining layer have not yet finished reacting. Thus, the two layers can form a diffusion layer. In this diffusion layer, the reaction of the resins creates covalent bonds that contribute to an altogether strong bond. By the same token, the layers are preferably not filled smoothly into the pressing mold. Owing to the surface structure, which is rough rather than smooth, the contact surface area of the phases to each other is increased. This likewise increases the bonding of the phases to each other, that is to say, the mixtures for the damping material and the friction material are preferably layered on top of each other and then, as explained, pressed together in one work step.

The most important and preferred subject matters, features and aspects of the present invention will be compiled below.

The invention comprises, among other things, preferably a damping material for a damping layer or interlayer of a brake lining which contains at least one rubber and one resin, whereby a plurality of macroscopic, heterogeneously delimited areas (Phase 1) are formed in the damping material, said areas comprising the rubber areas with a high rubber content of at least 3% to maximally 50% by weight, and resin areas (Phase 2) with a high resin content of at least 5% by weight, and whereby the rubber areas are preferably free of resin or have a resin content ≤5% by weight, and the resin areas are free of rubber.

The term "heterogeneously delimited areas" particularly refers to those areas that have an irregular contour or an irregular outer boundary. In this context, contours or outer boundaries of the individual areas preferably differ from each other to a great extent.

Figure 1:
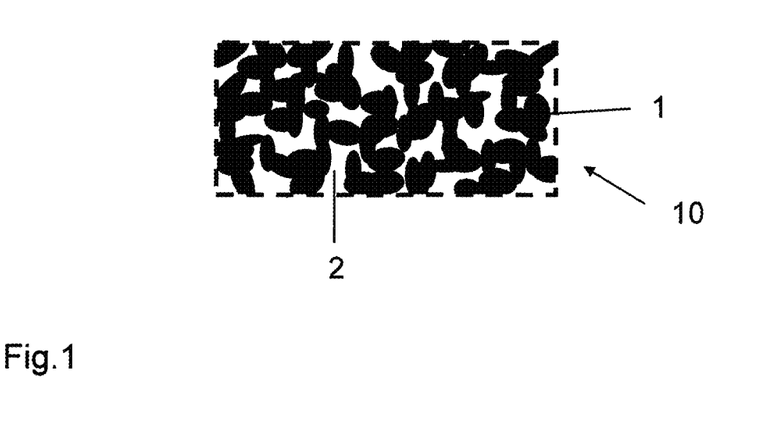
FIG. 1 is a schematic, enlarged view of the surface of one embodiment of the damping material according to the invention.
Figure 2:
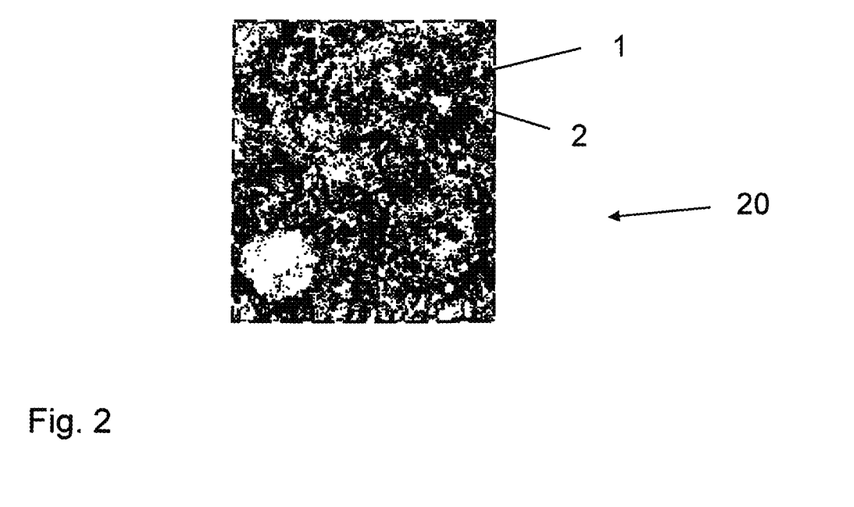
FIG. 2 is a top plan view of the surface of another embodiment of the damping material according to the invention after a shear test.
Figure 3:
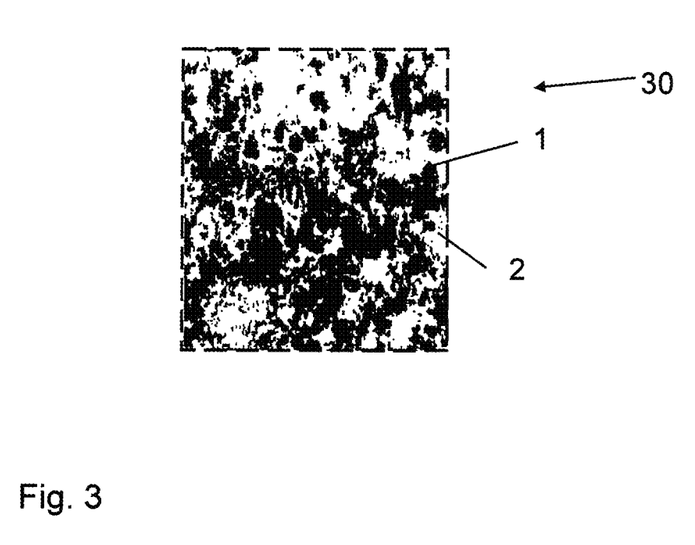
FIG. 3 is a top plan view of the surface of yet another embodiment of the damping material according to the invention after a shear test.

As set forth in the present invention, the rubber areas (Phase 1) are then free of resin and the resin areas (Phase 2) are free of rubber if rubber or resin are not present or not detectable in the appertaining other area, or if rubber or resin cannot be detected in the appertaining other area with the naked eye or with an optical microscope, a situation that is indicated, for example, by clear (sharp) area boundaries or phase boundaries as depicted in FIGS. 1 to 3.

Another conceivable designation for this meaning according to the invention of the term "free of" would be that the appertaining area or phase is "free or largely free of" the appertaining other component. This is the case, for example, if only a very small amount of the other component has entered the other area, for instance, by diffusing into it. A small amount is, for example, when resin or rubber makes up less the 1% by weight of the other area.

In a sectional view of the damping material, at least one of the rubber areas can be at least 4 mm long.

In a sectional view of the damping material, at least one of the resin areas can be at least 1 mm long.

The rubber areas (Phase 1) of the damping material preferably have a rubber content of 5% to 25% by weight.

The rubber areas of the damping material preferably contain an NBR rubber or the above-mentioned EVAC rubber as the only rubber or else in a mixture with other rubbers.

The rubber areas of the damping material preferably have a fiber content of 30% to 60% by weight and/or a filler content of 15% to 40% by weight.

The resin areas (Phase 2) of the damping material preferably have a resin content of 10% to 35% by weight and/or a fiber content of 10% to 70% by weight.

The resin areas preferably embed the rubber areas in the damping material.

The constituents of the resin areas and of the rubber areas are preferably homogeneously distributed in the appertaining areas.

The damping material can consist of 50% to 70% by weight of rubber areas.

The damping material preferably consists of 50% to 90% by volume of rubber areas.

The damping material especially preferably consists of 65% to 80% by volume of rubber areas.

Moreover, the present invention encompasses a brake lining with a lining carrier and a friction layer, whereby a damping layer or interlayer made of a damping material according to the preceding description is arranged between the lining carrier and the friction layer.

Finally, the invention also relates to a production method for a damping material as described above, comprising the following method steps:
a) rubber pre-mixing
  (i) providing the starting materials for rubber areas which contain rubber, fillers and/or fibers, and optionally resin or resin mixtures,
  (ii) kneading the starting materials from step (i) at least once,
  (iii) grinding the compound obtained in step (ii) to a particle size smaller than 4 mm,
b) mixing the resin and distributing the particles from step
  (iii) in the resin mixture,
  (iv) providing the raw materials for resin areas that contain resin or resin mixtures,
  (v) mixing the particles from step (iii) with the raw materials from step (iv) and
  (vi) pressing the compound obtained in step (v) to form the desired damping material.

Within the scope of the production of a lining, the compound obtained in step (v) can be used directly to produce a damping layer on a friction layer. In this process, the compound and the mixture for the friction layer are layered on top of each other and pressed together as described.

DETAILED DESCRIPTION

FIG. 1 shows a schematic, enlarged view of the macroscopic structure (of the surface) of the damping material 10 according to the invention, as can be seen with the naked eye or with an optical microscope. Here, Phase 1, i.e. the reinforced rubber phase, is shown in black (1), whereas the matrix Phase 2 (consisting of resin and additional fibers and fillers) into which Phase 1 is embedded, is shown in white (2).

FIG. 2 shows the structure of the damping material 20 according to the invention in a first embodiment after a shear test. Here, 70% by volume of the material consists of the black reinforced rubber Phase 1 and 30% by volume of the matrix Phase 2 (shown in white) into which rubber Phase 1 is embedded. Rubber Phase 1 displays clear area boundaries vis-à-vis the matrix Phase 2.

FIG. 3 corresponds to FIG. 2 in terms of the depiction and the description, whereby, in this case, the damping material 30 in a second embodiment is made up 50% by volume of rubber Phase 1 and 50% by volume of the matrix phase or resin Phase 2. The area boundaries or phase boundaries are clearly defined here as well.

FIGS. 1 to 3 show the preferred embodiment of the present invention in which rubber Phase 1 is free or largely free of resin constituents as set forth in the present invention.

LIST OF REFERENCE NUMERALS 1 phase
2 matrix phase
10 damping material
20 damping material
30 damping material

The invention claimed is:

1. A method for making a damping material for a damping layer or interlayer of a brake lining that has rubber areas and resin areas, comprising:
   a) kneading at least once a mixture of starting materials for the rubber areas of the damping layer to form a compound, said starting materials comprising rubber, one or more fillers, optionally one or more fibers and one or more fibers or one or more resins or resin mixtures
   b) grinding the compound of a) into particles of a particle size smaller than about 4 mm;
   c) forming a resin or resin mixture for the resin areas of the damping layer, wherein the resin or resin mixture of the resin areas comprises one or more fibers and/or comprises one or more fillers;
   d) distributing the particles in the resin or resin mixture of the resin areas;
   e) pressing the resin or resin mixture of the resin areas with distributed particles to form the damping material;

wherein the damping material comprises a first plurality of macroscopic, heterogeneously delimited rubber areas with a rubber content of at about 3% to about 50% by weight, a fiber content of about 20% to about 90% by weight and a filler content of 0% to about 50% by weight, each relative to the weight of the rubber areas, and a second plurality of macroscopic, heterogeneously delimited resin areas with a resin content of about 5% to about 50% by weight, a fiber content of about 10% to about 90% by weight and a filler content of 0% to about 50% by weight, each relative to the weight of the resin areas, and wherein the rubber areas are either free of resin from the resin areas or contain up to 5% by weight of resin from the resin areas and the resin areas are free of rubber.

2. The method according to claim 1, wherein the rubber areas of the damping material have a rubber content of 5% to 25% by weight, a fiber content of 30% to 60% by weight, a filler content of 15% to 40% by weight and a resin content of 0% to 50% by weight, each relative to the weight of the rubber areas.

3. The method according to claim 2, wherein the resin areas of the damping material have a resin content of 10% to 35% by weight, a fiber content of 10% to 70% by weight and a filler content of 15% to 40% by weight, each relative to the weight of the resin areas.

4. A damping material for a damping layer or interlayer of a brake lining that has rubber areas and resin areas made by the method of claim 2.

5. The damping material according to claim 4, wherein the damping material comprises 50% to 90% by volume of rubber areas.

6. A brake lining, comprising: a damping layer or interlayer formed of the damping material of claim 4 that is arranged between a brake lining carrier and a friction lining.

7. The method according to claim 1, wherein the resin areas of the damping material have a resin content of 10% to 35% by weight, a fiber content of 10% to 70% by weight and a filler content of 15% to 40% by weight, each relative to the weight of the resin areas.

8. A damping material for a damping layer or interlayer of a brake lining that has rubber areas and resin areas made by the method of claim 7.

9. The damping material according to claim 8, wherein the damping material comprises 50% to 90% by volume of rubber areas.

10. A brake lining, comprising: a damping layer or interlayer formed of the damping material of claim 8 that is arranged between a brake lining carrier and a friction lining.

11. The method according to claim 1, wherein the resin areas embed the rubber areas in the damping material.

12. The method according to claim 1, wherein the particles are homogeneously distributed in the resin or resin mixture of the resin areas.

13. The method according to claim 1, wherein the rubber areas are free or substantially free of the resin or resin mixture of the resin areas.

14. The method according to claim 1, wherein the rubber areas comprise either an NBR rubber or a rubber on the basis of ethylene-vinyl acetate acrylate as the only rubber or in a mixture with other rubbers.

15. A damping material for a damping layer or interlayer of a brake lining that has rubber areas and resin areas made by the method of claim 1.

16. The damping material according to claim 15, wherein the damping material comprises 50% to 90% by volume of rubber areas.

17. A brake lining, comprising: a damping layer or interlayer formed of the damping material of claim 15 that is arranged between a brake lining carrier and a friction lining.

18. A damping layer or interlayer for a brake lining, comprising:
- a first plurality of macroscopic, heterogeneously delimited rubber areas with a rubber content of at about 3% to about 50% by weight, a fiber content of about 20% to about 90% by weight and a filler content of 0% to about 50% by weight, each relative to the weight of the rubber areas; and
- a second plurality of macroscopic, heterogeneously delimited resin areas with a resin content of about 5% to about 50% by weight, a fiber content of about 10% to about 90% by weight and a filler content of 0% to about 50% by weight, each relative to the weight of the resin areas;
- wherein the rubber areas are either free of resin or contain up to 5% by weight of resin, and the resin areas are free of rubber.

19. The damping layer or interlayer of claim 18, wherein the rubber areas comprise particles of a particle size smaller than about 4 mm.

20. The damping layer or interlayer of claim 19, wherein the particles are homogeneously distributed in the resin of the resin areas.

* * * * *